Figure 1:
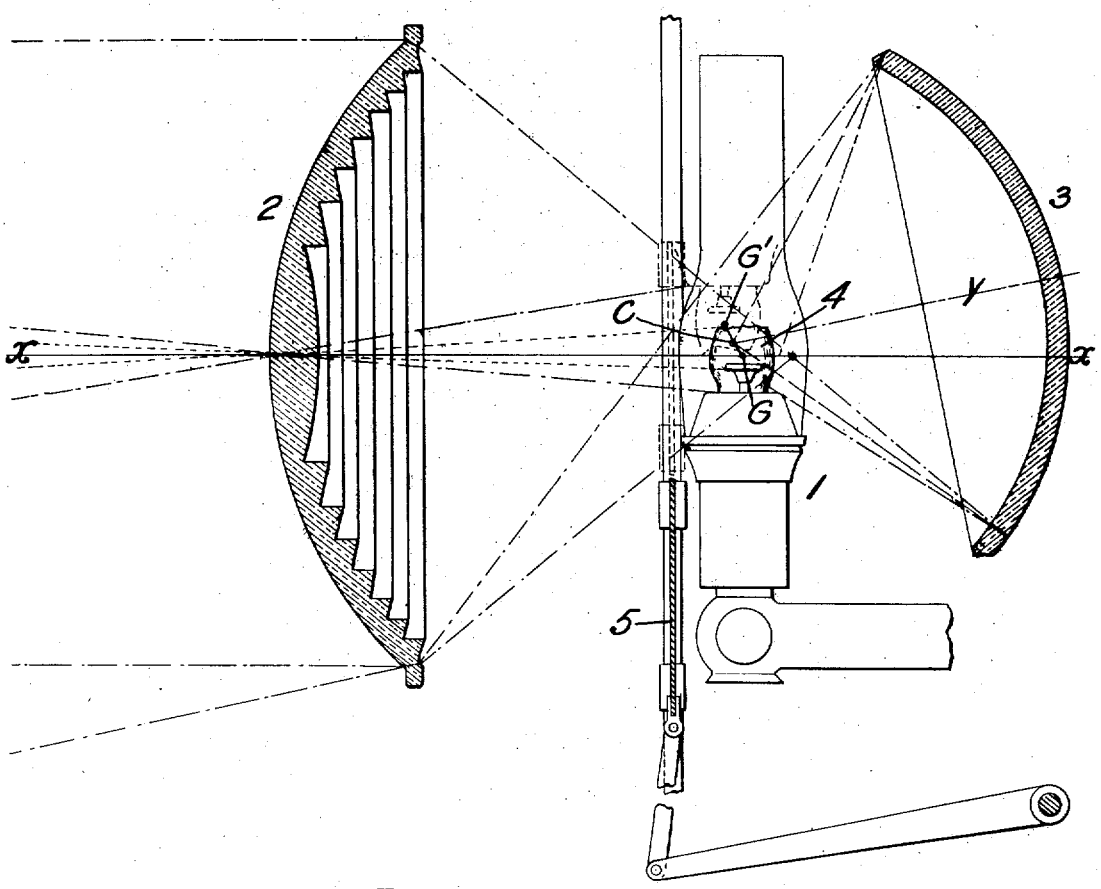

W. CHURCHILL.

OPTICAL SYSTEM FOR HEADLIGHTS.

APPLICATION FILED NOV. 18, 1915.

Reissued Apr. 11, 1916. 14,102.

Witness

Albert L. Key

Wilbur Churchill Inventor

By Vernon W. Worsey.

Attorney

UNITED STATES PATENT OFFICE.

WILLIAM CHURCHILL, OF CORNING, NEW YORK, ASSIGNOR TO CORNING GLASS WORKS, OF CORNING, NEW YORK.

OPTICAL SYSTEM FOR HEADLIGHTS.

14,102. Specification of Reissued Letters Patent. Reissued Apr. 11, 1916.

Original No. 1,092,560, dated April 7, 1914, Serial No. 700,537. Application for reissue filed November 18, 1915. Serial No. 62,254.

*To all whom it may concern:*

Be it known that I, WILLIAM CHURCHILL, a citizen of the United States of America, and a resident of Corning, New York, have invented certain new and useful Improvements in Optical Systems for Headlights, of which the following is a specification.

Ordinarily in railroad service the reflector, lens, or lens and reflector combination of the headlight are mounted in a way causing the axis of the system to be parallel to the base of the lamp, and under such arrangement the rays spread with more or less divergence from the axis, the divergence being equally divided above and below the axis. Therefore, practically one half of the light emanating from the lamp is projected upward above the level of the lamp, thus having but little or no effect in illuminating the pathway directly in front of the locomotive or other vehicle carrying the headlight. It has been a practice with railroad men in using a headlight so constructed to adjust it so that it is given a slight tilt forward, the extent of the inclination incident to such tilting being governed by the height of the headlight above the ground. By giving the headlight such a tilt or inclination the path in front of the headlight is more brilliantly illuminated, and there is less liability that the light will dazzle the eyes of an observer coming in a direction opposite to that taken by the engine. Nevertheless, when a headlight, especially if of the oil-burning type, is thus tilted or inclined, there is a great probability that the flame will not burn effectively and that the chimney will become smoked and ultimately cracked. Again, if the amount of inclination needed is left wholly to the discretion of the party responsible for the headlight, an error in its adjustment is likely to be made, particularly as no brackets or stands are usually provided suitable for the purpose mentioned.

In my Patent No. 1,004,627, dated October 3, 1911, means for preventing the divergence of the rays above a horizontal line are provided while at the same time the beam is thrown down to illuminate the pathway in front of the vehicle on which such headlight is mounted. In my said patent the lamp stands fixedly and immovably in a vertical line, the lens and reflector being arranged on a common axis downwardly inclined from the horizontal.

One of the purposes of my present invention is to effect the substantial results obtained in the use of my said former invention, but in a different and novel manner.

Another object is to provide means for conveniently cutting off from the headlight either the direct or the divergent beam, or both beams, thus entirely screening the headlight, in accordance with requirements under ordinary railroad practice.

Figure 2:
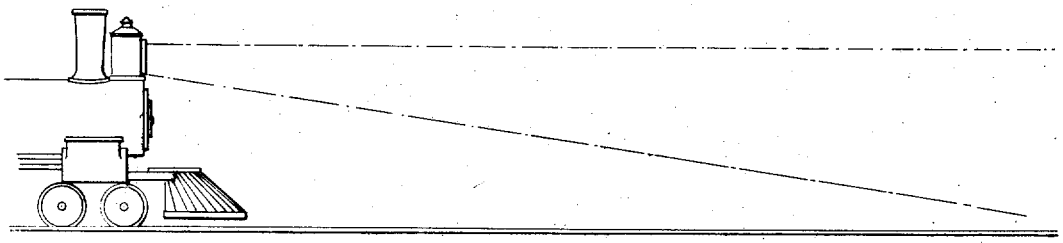

In the accompanying drawing, Figure 1 is an elevation, mainly in section, illustrating my invention, the casing of the headlight being omitted. Fig. 2 shows on reduced scale the invention applied to a headlight and in the act of illuminating the track.

Referring more particularly to Fig. 1, the light source lamp, burner and chimney may be generally shown as indicated by 1. 2 shows the lens and 3 the reflector. The lens is preferably of the Fresnel or corrugated type, but one, provided it is of the condensing type, of other suitable character may be substituted. The reflector is here shown of the spherical form as more especially adapted to my optical system, but may be varied in shape. The lamp stands in a vertical line, it being understood that such line is at a right angle to the base of the headlight. The major portion of the flame shown by 4 is above the principal axis of the lens indicated by the horizontal line $x$ $x$. The lens refracts the light falling thereon directly from the lamp into a beam, as is well known. Instead of placing the reflector 3 so that its center C of curvature shall coincide with the approximate center G of the source of illumination, and that the reflected rays shall return to the source each on its incident path, the axis $y$ of the reflector is elevated above and at an angle to the axis $x$ of the lens. When the reflector is so disposed the reflected rays focus about a point somewhat forward of the vertical axis of the lamp and above the center G of the source of illumination. This effect is produced by positioning the reflector according to well known laws of reflection. The center C of curvature of the reflector is at the middle of the line connecting the source of illumination G with the center G′ of the image produced by the spherical reflector. By locating the real image produced by the reflector at a point as above described, the divergent beam produced by the rays reflected from the mirror and then reflected through the lens is so directed that the upward limit proceeds approximately in a line parallel with the track, while the greater portion of the divergent beam is projected downward in the immediate foreground of the engine.

My invention has important advantages which will be readily appreciated by persons familiar with railroad practice. Thus the projection of light above a plane parallel to the track is prevented, and which if allowed is liable to have the effect of reaching signals at the sides of the track. These signals usually contain roundels of red, green and other colored glass, and where a beam of light strikes such a signal a ray of colored light is thrown back to the eye of the engineer giving to him misleading signal indications. While such dangerous conditions are obviated, the reflected glare produced from the upward or divergent rays which distorts and confuses his vision, is cut out. It is also necessary and provided by my invention, that the track in the foreground, as far as practicable, is illuminated without centering the rays upon any particular spot, it being especially important to avoid the production of a spot of light at a special point—as in the foreground or middle distance—the existence of such spot having the effect of greatly intensifying the darkness beyond. Such intense illumination at one point has a tendency, by contrast, to produce the effect of total darkness at a greater distance, thereby preventing the perception of objects which, with uniform illumination of moderate degree, would be visible.

As an additional feature of my invention, I furnish an opaque screen 5 of metal or other substance mounted in some approved manner so as to adapt it to be movable, it being placed immediately in front of the source of illumination. It may be made to slide in a vertical direction or transversely of the headlight casing, or to move upon a hinge or otherwise. This screen 5 is designed to be moved to cut off either the direct beam, or the diverging beam, or both when it is desired to totally eclipse the headlight.

The screen 5 by its movements is capable of four uses. Thus, as shown in dotted lines in Fig. 1, the screen, occupying a central position, eclipses the headlight. By moving the screen to its lowermost position, as shown in full lines, the direct and diverging beams are both displayed. By moving the screen upward from its lowermost position so that its upper edge shall extend above the light emanating from the lamp and directly impinging on the lens, the direct beam is shut off while the downwardly diverging beam produced by means of a reflected image located above the real source, as before described, remains exposed. By moving the screen upward so that its lower edge shall extend just below the light emanating from the reflected image which produces the downwardly diverging beam this beam is shut off while the direct beam is exposed.

The important features entering into my present optical system consist, first, in the disposition of the center of curvature of the reflector with respect to the source of illumination, and the use of a reflector in conjunction with a lens, the parts being so arranged that the center of curvature of the reflector is above the principal axis of the lens; and second, in the screen placed in front of the source of illumination and adapted to be used for cutting off either the direct beam or the diverging beam, or to entirely screen the headlight.

My invention is applicable not only to headlights for locomotives, but also to such as are used for interurban and other cars, as also generally to signal lamps and light projectors.

While I have shown my invention as involving the use of an oil burner, electricity, gas or other illuminant may be employed as preferred.

Having thus described my invention, I claim:—

1. In an optical system for headlights, the combination of a casing having a horizontal base, a lamp standing in a vertical line, a concentrating lens located with its axis parallel to the base of the casing, and a reflector the axis of which is elevated above and at an angle to the axis of the lens, substantially as described.

2. In an optical system for headlights, the combination of a casing having a horizontal base, a lamp standing in a vertical line, a lens located with its axis parallel to the base of the casing, a reflector the axis of which is elevated above and at an angle to the axis of the lens, a movable screening device placed in front of the source of illumination, and means for moving said screening device to a plurality of screening positions relatively to said source of illumination, substantially as set forth.

3. In an optical system for headlights, the combination of a lens, a source of illumination located in substantially the axis of the lens, a concave reflector so mounted that its axis is above and at an angle to the axis of the lens, whereby a real image of the source of illumination is formed at one side of the lens-axis, a screen mounted to move between said lens and said source of illumination, and means for moving said screen to a plurality of positions relatively to said image and said source of illumination, each of said positions screening the lens from illumination from the source or from the real image, substantially as set forth.

4. In an optical system for headlights, a combination of a casing having a horizontal base, a light source, a concentrating lens located with its axis parallel to the base of the casing, and a reflector, the axis of which is elevated above, and at an angle to the axis of the lens.

5. In an optical projecting system, the combination of a concentrating lens, a light source located adjacent to the focus of the lens, and in the principal axis thereof, and a mirror situated so as to form a real image of the light source between the latter and the lens, and to one side of the principal axis of the lens.

6. In an optical projecting system, the combination of a light source, a concentrating lens, and a reflector, the axis of the reflector being at an angle to the principal axis of the lens and forming a real image of the light source to one side of the same, and between the source and the lens.

7. In an optical projecting system, the combination of a light source, a lens concentrating light falling thereon from the light source into a beam, and a reflector having its center of curvature in front of and to one side of the light source and forming a real image of the light source above and in front thereof, whereby the lens will refract the rays forming such image into a beam whose axis is at an angle to the beam formed by refraction of rays falling on the lens from the light source.

In testimony whereof I have signed my name.

WILLIAM CHURCHILL.